United States Patent [19]
Rich et al.

[11] Patent Number: 5,438,788
[45] Date of Patent: Aug. 8, 1995

[54] FISH HOOK SETTING DEVICE

[76] Inventors: Homer C. Rich, 1100 S. Noland Rd., Independence, Mo. 64050; Robert E. Morgan, 2255 NE. Porter Rd., Blue Springs, Mo. 64015

[21] Appl. No.: 243,209
[22] Filed: May 16, 1994
[51] Int. Cl.⁶ ............................................. A01K 97/00
[52] U.S. Cl. .................................................... 43/15
[58] Field of Search ..................................... 43/15, 16

[56] References Cited

U.S. PATENT DOCUMENTS

| | | |
|---|---|---|
| 2,204,560 | 6/1940 | Allison ............................ 43/15 |
| 2,557,030 | 6/1951 | Inglis . |
| 2,559,537 | 7/1951 | Haynie . |
| 2,560,875 | 7/1951 | Knott ............................. 43/15 |
| 2,568,999 | 9/1951 | Gunser . |
| 2,582,758 | 1/1952 | Rose . |
| 2,594,875 | 11/1952 | Hoffmann . |
| 2,631,399 | 3/1953 | Sowa .............................. 43/15 |
| 2,799,109 | 7/1957 | Remington . |
| 2,801,487 | 8/1957 | Morgan . |
| 3,006,102 | 10/1961 | Chapman ........................ 43/15 |
| 3,060,615 | 10/1962 | Spets . |
| 3,162,969 | 12/1964 | Knott . |
| 3,220,138 | 11/1965 | Greenfield . |
| 3,314,185 | 4/1967 | McCoy et al. . |
| 3,403,467 | 10/1968 | Ju . |
| 3,660,922 | 5/1972 | Chill . |
| 3,766,679 | 10/1973 | Noe . |
| 3,771,250 | 11/1973 | Hehnke . |
| 3,823,501 | 7/1974 | Bybee . |

Primary Examiner—P. Austin Bradley
Assistant Examiner—James Miner
Attorney, Agent, or Firm—Litman, McMahon & Brown

[57] ABSTRACT

A fish hook setting device comprising a cylindrical housing containing a plunger and a compression-type coil spring. The plunger includes a head and a shaft. The shaft of the plunger extends through the coil spring which is positioned within the housing between an annular wall formed in the lower end of the housing and an overhanging edge formed by the head of the plunger. The shaft further includes a notch defining an upwardly directed abutment surface. The plunger may be drawn from the housing so as to compress the spring. When the notch is advanced out of the housing the plunger is advanced to one side of the housing so that the abutment surface may be placed in contact with the lower surface of the annular wall to prevent the plunger from retracting until an additional force is applied to the plunger preferably from a fish taking a baited hook secured thereto.

13 Claims, 1 Drawing Sheet

U.S. Patent      Aug. 8, 1995      5,438,788
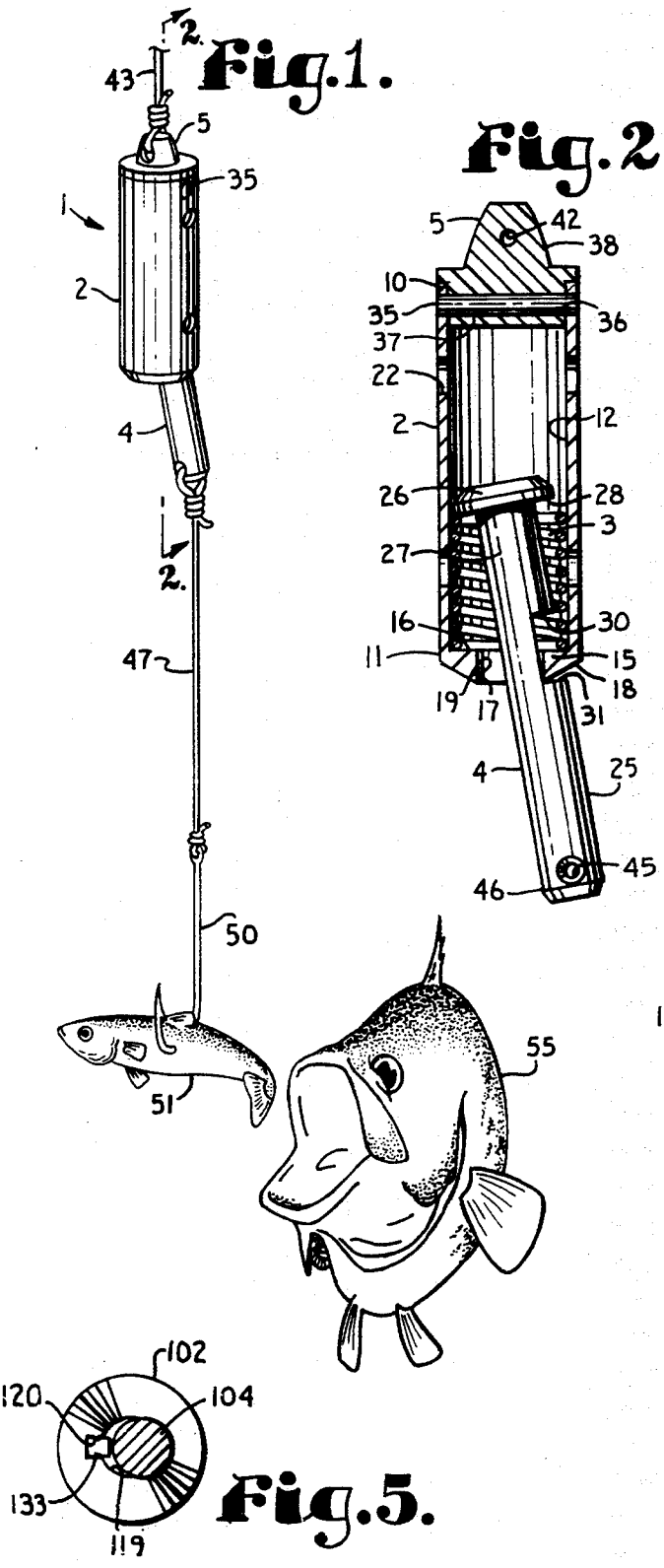

FISH HOOK SETTING DEVICE

BACKGROUND OF THE INVENTION

This invention relates to automatic fish hook setting devices.

In the sport of fishing, the fish is often able to remove the bait from a fisherman's hook before the fisherman is able to react to the presence of the fish and set the hook. This is especially a problem for inexperienced or inattentive fisherman. Numerous devices have been developed to automatically set the hook when the bait is taken by a fish. Such devices are also useful in situations where the fisherman does not want to constantly monitor the fishing line, such as on a trot line or when a fisherman is using several fishing poles at one time.

Others have designed similar devices for similar purposes. However, such devices generally are more complicated in construction, and therefore, more expensive to manufacture and more difficult to use.

SUMMARY OF THE INVENTION

The present invention generally comprises a plunger secured within a cylindrical housing having an opening extending through a bottom end of the housing and a cap covering the top end of the housing. The plunger includes a shaft portion and a head. The head of the plunger is of a diameter slightly larger than the shaft so as to form an overhanging edge. A notch is formed on one side of the shaft of the plunger and a bore is formed in the end of the shaft of the plunger opposite the head.

A coil spring is positioned within the cylindrical housing between the head of the plunger and a lower wall of the plunger through which the plunger opening extends.

Fishing line from a fishing pole or trot line may be secured to the cap of the device through a bore extending therethrough. A second section of fishing line having a hook secured thereto may be secured to the plunger through the bore extending therethrough.

The device is set by drawing the shaft of the plunger out of the cylindrical housing through the plunger opening such that the head of the plunger compresses the spring positioned within the housing. As the plunger is advanced to a position wherein the notch of the plunger shaft is adjacent the bottom wall of the cylindrical housing, the plunger is angled or advanced to one side such that a shoulder formed by the notch in the plunger engages a lower surface of the lower wall of the cylindrical housing and upon release of the plunger, the engagement of the shoulder with the lower wall prevents the spring from expanding and driving the shaft of the plunger back within the housing.

A tug from a fish taking the baited hook is sufficient to further compress the spring so as to advance the shoulder formed by the notch in the plunger away from the lower surface of the housing such that the spring is permitted to advance back to an extended position. The advancement of the spring to the extended position causes the shaft of the plunger to retract back within the cylindrical housing. The force of retraction of the plunger is sufficient to set the hook within the mouth of a fish.

OBJECTS AND ADVANTAGES OF THE INVENTION

Therefore, it is an object of this invention to provide a device which automatically sets a fish hook when the fish hook having bait thereon is taken by a fish; to provide such a device which may be secured to a length of fishing line; to provide such a device which functions as a sinker; to provide such a device which permits the fish hook to swivel once the hook is set within the mouth of a fish; to provide such a device which may be adapted to permit casting of a fishing line having one of the hook setting devices secured thereto and positioned in a set position without causing the device to advance out of a set position until the hook is taken by a fish; to provide such a device which is relatively simple to manufacture; to provide such a device which is particularly well adapted for its intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a fish hook setting device of the present invention shown in a set position and having a baited hook secured thereto.

FIG. 2 is an enlarged cross sectional view generally taken along line 2—2 of FIG. 1.

FIG. 3 is a view similar to FIG. 2 showing the device in a retracted or fish hook setting position.

FIG. 4 is a view similar to FIG. 2 showing an alternative embodiment of the present invention.

FIG. 5 is a cross sectional view generally taken along line 5—5 of FIG. 4.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally refers to a fish hook setting device of the present invention. The fish hook setting device 1 comprises a cylindrical housing 2, a compression-type coil spring 3, a plunger 4 and a cap 5.

The cylindrical housing 2, as best seen in FIGS. 2 and 3, generally comprises a hollow section of cylindrical tubing having an upper end 10, a lower end 11 and an inner cavity 12. An annular wall 15 projects radially inward at the cylindrical housing lower end 11 and includes an upper surface 16, an inner surface 17 and a lower surface 18. The inner surface 17 defines an opening 19 which opens into the inner cavity 12. The lower surface 18 forms an acute angle with the inner surface 17 of the annular wall 15. A plurality of bores 22 are formed in the cylindrical housing 2 and allow water to flow through the housing 2 when the housing 2 is immersed in water.

The compression type coil spring 3 is coaxially positioned within the inner cavity 12 of the housing 2 with a lower end of the spring engaging or resting on the upper surface 16 of the annular wall 15. The diameter of the coil spring 3 closely approximates but is slightly smaller than the diameter of the housing inner cavity 12.

The plunger 4 includes a shaft 25 and a head 26. The diameter of the shaft 25 closely approximates but is slightly smaller than the diameter of the opening 19 formed by the inner surface 17 of the annular wall 15. The head 26 of the plunger 4 is formed on an upper end 27 of the shaft 25 and has a diameter greater than the diameter of the shaft 25 so as to form a lip or overhanging surface 28. The diameter of the head 26 is also approximately equal to or slightly greater than the diameter of the coil spring 3. The plunger 4 is positioned within the housing inner cavity 12 such that the plunger shaft 25 extends through the coil spring 3 and the overhanging surface 28 of the plunger head 26 engages an upper end of the coil spring 3.

A notch 30 is formed in the shaft 25 on one side thereof. The notch 30 defines an upwardly directed abutment surface 31, the function of which will be described in more detail hereafter.

The cap 5 is secured within the open upper end 10 of the cylindrical housing 2 by means such as the pin 35 positioned in a bore 36 extending through the upper end of the housing 2 and through a bottom portion 37 of the cap 5 which extends into the housing inner cavity 12. It is foreseen that the cap 5 may be secured to the housing 3 by other means such as threading or gluing. The cap 5 also includes an upper portion 38 which extends above the housing 2 and is generally frusto-conical in shape. A bore 42 extends through the upper portion 38 of the cap 5 and functions as securement means for securing thereto an end of a first length of fishing line 43. An opposite end of this fishing line 43 (not shown) is secured to a fishing pole or the like. The ends of the bore 42 are preferably chamfered to reduce the likelihood of an edge thereof cutting the fishing line 43.

Another bore 45 extends through a lower end 46 of the plunger shaft 25 and functions as securement means for securing thereto an end of a second length of fishing line 47. A fish hook 50 is secured to an opposite end of the second length of fishing line 47 and bait 51 may be secured thereto. The ends of the bore 45 are preferably chamfered to reduce the likelihood of an edge thereof cutting the fishing line 47.

When the coil spring 3 is in the extended or resting state a substantial portion of the shaft 25 including the portion with the notch 30 therein is positioned within the cavity 12 of the housing 2 and the lower end 46 of the shaft 25 extends through the opening 19 and beyond the lower end 11 of the housing 2. In this arrangement the plunger 4 is described as being in a retracted position.

To place the fish hook setting device 1 in a set position or otherwise in condition for use, the fisherman grasps the plunger shaft lower end 46 and draws the plunger shaft 25 out of the housing 2 against the biasing force of the spring 3 until the abutment surface 31 is advanced slightly beyond the lower surface 18 of the housing 2. The plunger shaft 25 is then advanced or angled laterally such that the abutment surface 31 is positioned below the lower surface 18 of the annular wall 15. The abutment surface 31 is then allowed to advance into engagement or abutting relationship with the lower surface 18 of the annular wall 15 through the biasing force of the spring 3. Abutment of the abutment surface 31 against the annular wall lower surface 18 prevents the coil spring 3 from further advancing the plunger 4 to the retracted position. In this arrangement, the plunger 4 is deemed in a set position.

With the plunger 4 in the set position, the fisherman may drop the fishing line 43 with the fish hook setting device 1 and the second length of fishing line 47 secured thereto into a body of water typically off a dock or over the side of a boat. The force of a fish 55 taking the bait 51 advances the plunger 4 laterally or downward and laterally and thereby advances the abutment surface 31 out of engaging relationship with the annular wall lower surface 18 and out from beneath the abutment surface 31. The biasing force of the coil spring 3 then rapidly advances the plunger 4 to the retracted position which causes the hook 50 to rapidly advance upward in the mouth of the fish 55 so as to set the hook 50 therein. For the purposes of this patent an outwardly directed force is intended to mean a force applied to the plunger and directed laterally or downward and laterally with respect to the housing 2 so as to advance the abutment surface 31 out of engaging relationship with the annular wall lower surface 18 and out from beneath the abutment surface 31.

In addition to functioning as a fish hook setting device, the present invention also functions as a sinker and a swivel. The plunger head 26 is not connected to the spring 3. After the hook 50 has been set in the mouth of a fish 55 and the plunger 4 has advanced out of the set position, the plunger 4 freely rotates within the housing 2 thereby functioning as a swivel and reducing the likelihood that a caught fish will be able to break the lines 43 or 47 by twisting.

The reference numeral 101 refers to an alternative embodiment of the fish hook setting device as shown in FIGS. 4 and 5. The device 101 is substantially similar to the device 1 and includes a cylindrical housing 102, a compression type coil spring 103, a plunger 104 and a cap 105.

A lower end 111 of the cylindrical housing includes an annular wall 115 having an upper surface 116, an inner surface 117, a lower surface 118 and an opening 119 extending therethrough. A slot 120 is formed in the annular wall 115 adjacent and coextensive with the opening 119.

The device 101 also includes a notch 130 which defines an abutment surface 131. When placing the plunger 104 in a set position in the manner discussed above for device 1, it is preferable to angle the plunger 104 away from the slot 120, such that the abutment surface 131 engages the lower surface 118 of the annular wall 115 on a side of the annular wall 115 opposite the slot 120.

With the plunger 104 in the set position, a wedge 133, formed from material which rapidly dissolves in water, such as compressed sodium bicarbonate, may be placed in the slot 120 and the space formed between the plunger 104 and the annular wall 115 such that the wedge 133 abuts against the plunger 104 and prevents the plunger 104 from advancing out of the set position. This arrangement permits the fisherman to cast the fishing line having the device 101 secured thereto in a set position without causing the plunger 104 to advance out of the set position during casting.

When the device 101 hits the water, the wedge 133 dissolves thereby allowing the plunger 104 to advance to a retracted hook setting position when a hook secured thereto is taken by a fish.

The notch 130 does differ from the notch 30 of the device 1 in that the notch 130 has an angular cross section as opposed to a rectangular cross section as with notch 30.

It is foreseen that the components of the fish hook setting device 1 may be manufactured from aluminum, stainless steel or plastic.

It is to be understood that while certain forms of the present invention have been illustrated and described herein, it is not to be limited to the specific forms or arrangement of parts described and shown.

What is claimed and desired to be secured by Letters Patent is as follows:

1. A fish hook setting device comprising:
   (a) a housing having an upper end, a lower end and an inner cavity; said housing further having a wall extending partially across said lower end of said housing and forming an opening extending therethrough;
   (b) first securement means for securing a first length of fishing line to said upper end of said housing;
   (c) a plunger having a shaft and a head and positioned within said cavity such that said shaft is advanceable through said opening in said housing lower end;
   (d) a compression-type coil spring positioned within said cavity between said housing lower end wall and an overhanging edge of said plunger with said shaft of said plunger extending through said coil spring;
   (e) second securement means for securing a second length of fishing line to said shaft;
   (f) said plunger shaft having a notch formed in a side thereof and defining an abutment surface integrally and fixedly positioned in said plunger shaft and adapted to be positioned in abutting relationship with a lower surface of said housing lower end wall after said plunger shaft has been partially drawn out of said housing through said opening against the biasing force of said coil spring; abutment of said abutment surface of said shaft against said lower surface of said housing lower end wall preventing retraction of said plunger shaft within said housing so as to maintain said plunger in a set position and whereby application of a force on said plunger shaft directed away from said housing upper end advances said abutment surface out of engagement with said lower surface of said housing lower end wall allowing said coil spring to expand such that said plunger shaft is retracted into said housing.

2. The fish hook setting device as disclosed in claim 1 wherein:
   (a) said housing includes a plurality of bore holes extending transversely therethrough.

3. The fish hook setting device as disclosed in claim 1 wherein:
   (a) said lower surface of said housing lower end wall forms an acute angle with an inner surface of said housing lower end wall.

4. The fish hook setting device as disclosed in claim 1 wherein said first securement means comprises:
   (a) a cap fixedly secured to said housing upper end and having a bore extending therethrough sized for receiving a strand of fishing line.

5. The fish hook setting device as disclosed in claim 1 wherein said second securement means comprises:
   (a) a bore extending through said shaft and sized for receiving a strand of fishing line.

6. The fish hook setting device as disclosed in claim 1 further comprising:
   (a) set means for preventing said plunger from being advanced out of said set position until said device is immersed in water.

7. The fish hook setting device as disclosed in claim 6 wherein said set means comprises:
   (a) a wedge formed from water soluble material and positionable within a space formed between said plunger and an inner surface of said housing lower end when said plunger is secured in said set position.

8. A fish hook setting device comprising:
   (a) a housing having an upper end, a lower end, an inner cavity and an opening extending through said housing lower end;
   (b) first securement means for securing a first length of fishing line to said upper end of said housing;
   (c) a plunger having an upper end and a lower end and positioned within said cavity such that a lower end of said plunger extends through said opening in said housing lower end;
   (d) biasing means positioned within said cavity for biasingly urging said plunger into a retracted position;
   (e) second securement means for securing a second length of fishing line to said plunger;
   (f) abutment surface formed on a side of said plunger and adapted to be positioned in abutting relationship with a lower surface of said housing lower end after said plunger has been partially drawn out of said housing through said opening against the biasing force of said biasing means to prevent retraction of said plunger within said housing so as to maintain said plunger in a set position and whereby application of a force on said plunger directed away from said housing upper end advances said abutment surface cut of engagement with said lower surface of said housing lower end allowing said biasing means to advance said plunger to said retracted position;
   (g) set means for preventing said plunger from being advanced out of said set position until said device is immersed in water.

9. The fish hook setting device as disclosed in claim 8 wherein said set means comprises:
   (a) a wedge formed from water soluble material and positionable within a space formed between said plunger and an inner surface of said housing lower end when said plunger is secured in said set position.

10. The fish hook setting device as disclosed in claim 8 wherein:
    (a) said housing includes a plurality of bore holes extending transversely therethrough.

11. The fish hook setting device as disclosed in claim 8 wherein:
    (a) said lower surface of said housing lower end forms an acute angle with an inner surface of said housing lower end.

12. The fish hook setting device as disclosed in claim 8 wherein said first securement means comprises:
    (a) a cap fixedly secured to said housing upper end and having a bore extending therethrough sized for receiving a strand of fishing line.

13. The fish hook setting device as disclosed in claim 8 wherein said second securement means comprises:
    (a) a bore extending through said plunger and sized for receiving a strand of fishing line.

* * * * *